United States Patent Office 3,645,934
Patented Feb. 29, 1972

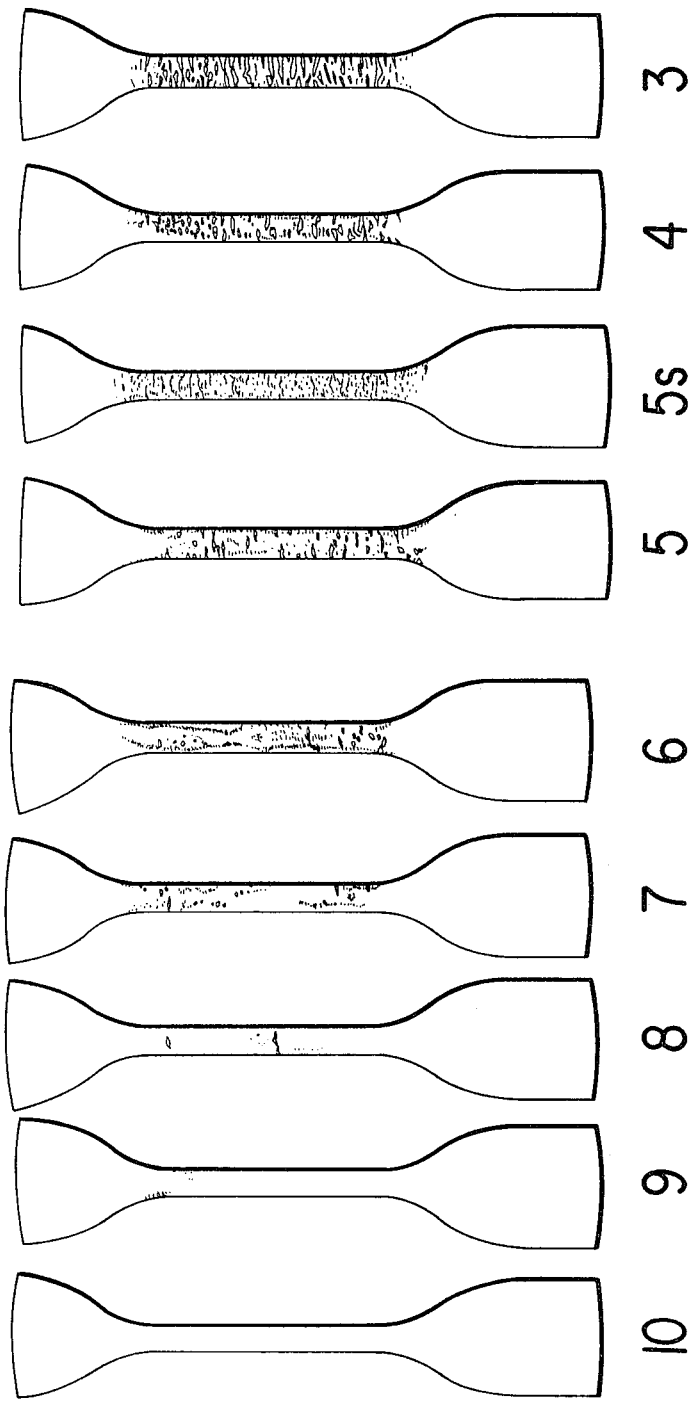

3,645,934
OZONE RESISTANT BLENDS OF NATURAL RUBBER/POLYCHLOROPRENE/EPDM COPOLYMER AND A PROCESS FOR THE PREPARATION THEREOF
Stanley William Caywood, Jr., Wilmington, Del., assignor to E. I. du Pont de Nemours and Company, Wilmington, Del.
Filed Aug. 10, 1970, Ser. No. 62,595
Int. Cl. C08c 9/10
U.S. Cl. 260—5
11 Claims

ABSTRACT OF THE DISCLOSURE

There is provided a vulcanizable elastomeric composition having improved resistance to ozone and a process for its preparation. The process consists essentially of preparing a premix by mixing about 15-30 parts based on the total weight of rubbers of a random, linear elastomeric ethylene/propylene/open-chain non-conjugated diene copolymer having a Mooney viscosity (ML–1+4/121° C.) of about 35-75 with about 20-35 parts based on the total weight of rubbers mercaptan-modified sol of a polymer of chloroprene having a Mooney viscosity (ML–1+2.5/100° C.) of about 50, and about 25-60 parts based on the total weight of rubbers of a reinforcing carbon black having an EM surface area of at least about 40 square meters per gram, and mixing the premix with about 50-60 parts based on the weight of total rubbers of natural rubber.

BACKGROUND OF THE INVENTION

This invention relates to vulcanizable chain-saturated elastomeric α-olefin copolymers. More particularly this invention relates to improving the ozone resistance of mixtures of natural rubber with certain vulcanizable, chain-saturated, elastomeric α-olefin copolymers and a polychloroprene by controlling the order of mixing of the components.

Among the polymers of the aliphatic olefins that are made by use of coordination complex compounds of the transition metals as polymerization initiators, the amorphous copolymers of ethylene with higher alpha-mono-olefins constitute an important class because of their desirable elastomeric character and their generally good resistance to ozone and other chemicals. The chemical inertness of these polymers is attributed to the fact that the linear chain or "backbone" is a completely saturated structure without the reactive double bonds of the common elastomeric materials such as natural rubber or the synthetic elastomers made from conjugated diolefins. This chemical inertness made the early polyolefin elastomers, namely amorphous ethylene-propylene copolymers, impossible to vulcanize with the sulfur systems preferred in the rubber industry. This problem was solved by incorporating as a third monomer non-conjugated diolefins containing both a readily polymerizable and a relatively non-polymerizable double bond, thus forming an elastomeric polymer consisting of a linear saturated backbone having pendant unsaturated hydrocarbon groups capable of participating in crosslinking reactions with sulfur curing systems. The use of non-conjugated aliphatic diolefins such as 1,4-hexadiene and 6-methyl-1,5-heptadiene as the third monomer in hydrocarbon elastomers of this sort is taught, for instance, in U.S. Pat. 2,933,480, and the use of bridged ring diolefins having double bonds of unequal reactivity is similarly taught in U.S. Pat. 3,211,709. These tripolymers are generally referred to as EPDM copolymers.

Tire sidewalls are subject to relatively rapid deterioration and failure when formulated using blends of natural rubber and the substantially straight-chain EPDM copolymers. Ternary blends of natural rubber, polychloroprene and substantially linear EPDM copolymers are known in the art. However neither has the ozone resistance of these blends wherein the EPDM is made from open-chain dienes proved entirely satisfactory for use of these blends in tire sidewall formulations.

SUMMARY OF THE INVENTION

According to this invention there is provided a process for preparing a vulcanizable ozone resistant composition consisting essentially of natural rubber, carbon black, chloroprene, and an EPDM copolymer which consists essentially of preparing a premix by mixing about 15-30 parts based on the total weight of rubbers of a random, linear, elastomeric ethylene/propylene/open-chain non-conjugated diene copolymer having a Mooney viscosity (ML–1+4/121° C.) of about 35-75 with about 20-35 parts based on the total weight of rubbers of a mercaptan-modified sol polymer of chloroprene having a Mooney viscosity (ML–1+2.5/100° C.) of about 50, and about 25-60 parts based on the total weight of rubbers of a reinforcing carbon black having an EM surface area of at least about 40 square meters per gram, and mixing the premix with about 50-60 parts based on the weight of total rubbers of natural rubber.

There is also provided the vulcanizable ozone resistant composition made by the process of this invention.

As used herein, the term "consisting essentially of" has its generally accepted meaning as requiring that specified components be present but not excluding unspecified ingredients which do not materially detract from the basic and novel characteristics of the composition as disclosed.

BRIEF DESCRIPTION OF THE DRAWINGS

The figure is a photograph of standards used as a reference to determine the ozone resistance of various elastomeric compositions. Use of the standards is fully described in the example.

DESCRIPTION OF THE INVENTION

The EPDM copolymers used in practicing this invention are well known in the art. They are conveniently prepared by reacting ethylene, propylene, and an open-chain non-conjugated diene in the presence of a coordination catalyst system.

Methods for carrying out the polymerization of olefin hydrocarbons with coordination complex catalysts are well known in the art. See, for instance. "Linear and Stereo-regular Addition Polymers," by Gaylord and Mark, Interscience Publishers, New York, 1959, and U.S. Pat. 2,933,480. Among the most useful catalyst systems for making elastomeric copolyolefins are those based on hydrocarbon soluble compounds of vanadium such as vanadium oxytrichloride, vanadium tetrachloride, vanadium tris-(acetylacetonate), etc., used in conjunction with organoaluminum compounds such as aluminum alkyls (e.g., triisobutyl aluminum), and alkyl aluminum chlorides or bromides (e.g., diisobutyl aluminum chloride), and so on. Halogen should be present on at least one of the catalyst components. Many variations and refinements of these catalyst systems are now well known in the art.

A variety of solvents can be employed with the catalyst. Among the most useful are tetrachloroethylene, and aliphatic hydrocarbons such as hexane. Other solvents will be apparent to those skilled in the art.

Methods for copolymerizing ethylene and propylene to form amorphous polymers that have the basic characteristics of a synthetic rubber are well known in the art. The principle of making such polymers vulcanizable with sulfur curing systems by introducing as a third polymerizable monomer a multiolefin having only one polymerizable double bond is also known. Polymerizable double bonds in coordination polymerization systems are generally found to be unhindered terminal double bonds in aliphatic olefins, or double bonds in strained ring cycloaliphatic compounds, such as cycloaliphatic compounds having one- or two-carbon bridged ring structures. Double bonds that are found not to be readily polymerizable are generally the internal, i.e., nonterminal double bonds of aliphatic olefins, sterically hindered double bonds of aliphatic olefins such as those carrying a methyl group or other substitutent on one of the doubly bonded carbon atoms, and double bonds in relatively unstrained cycloaliphatic rings. Typical non-conjugated diolefins containing only one polymerizable double bond that are suitable in EPDM copolymers useful in this invention are 1,4-hexadiene, 2-methyl-1,5-hexadiene, 1,9-octadecadiene, 6-methyl-1,5 - heptadiene, 7-methyl-1,6-octadiene, 11-ethyl-1,11-tridecadiene, and the like. The use of such compounds to provide pendant sulfur-reactive unsaturated structures on an amorphous polyolefin is well known in the art.

The EPDM copolymers useful in this invention are the random, linear, elastomeric ethylene/propylene/open-chain non-conjugated diene copolymers. No particular advantage in controlling the order of mixing has been found using EPDM copolymers containing a cycloaliphatic compound. Useful EPDM copolymers have a Mooney viscosity (ML-1+4/121° C.) of about 35-75. The preferred viscosity is about 50-70. Mooney viscosity is measured at 121° C. in accordance with ASTM Method D-1646-67 using the large rotor. After the sample has been warmed in the machine for one minute, the shearing disc viscometer motor is started. Four minutes later the reported viscosity reading is taken. About 15-30 parts based on the total weight of rubbers of the EPDM copolymer are used in preparing the premix. It is preferred to use about 18-22 parts based on the total weight of rubbers of the EPDM copolymer. A particularly preferred EPDM copolymer is ethylene/propylene/1,4-hexadiene.

As used herein, the phrase "parts based on the total weight of rubbers" means parts by weight divided by the sum of the parts by weight of the natural rubber, the open-chain non-conjugated diene, and the mercaptan-modified sol of a polymer of chloroprene in the vulcanizable ozone resistant composition.

The premix also contains about 20-35 parts based on the total weight of rubbers mercaptan-modified sol of a polymer of chloroprene. Chloroprene, 2-chloro-1,3-butadiene, is well known in the art. The mercaptan-modified sol polymer of chloroprene and the method of preparation are also known in the art. See, for example, U.S. Pat. 2,914,497 (Example 1) and U.S. Pat. 2,494,087 (Example 6). The mercaptan modified polychloroprene useful in this invention has a Mooney viscosity (ML-1+2.5/100° C.) of about 50. Mooney viscosity is measured in accordance with ASTM Method D-1646-67. The preferred amount of the mercaptan-modified sol polymer of chloroprene is about 28-32 parts based on the total weight of rubbers.

The premix also contains about 25-60 parts based on the total weight of rubbers of a reinforcing carbon black having an EM surface area of at least about 40 square meters per gram. EM surface area refers to the surface area as measured using an electron microscope. The preferred amount of reinforcing carbon black is about 25-50 parts by weight. Particularly preferred blacks are FEF and HAF carbon black (types N-550 and N-330, respectively, according to ASTM Standard D-1765-68). Other blacks according to ASTM Standard D-1765-68 include SAF (type N-110), SCF (type N-195), ISAF-LS (type N-219), ISAF-HM (type N-220), ISAF-LM (type N-231), ISAF-HS (type N-242), CF (types N-293 and N-296), SCF (type N-294), EPC (type S-300), MPC (type S-301), HAF-LS (types N-326 and N-327), HAF-HS (type N-347), SPF (type N-358), FF (type N-440), FEF-LS (type N-539), FEF-HS (type N-568), HMF (type N-601), GPF (type N-660), and APF (type N-683). Carbon blacks are further described in U.S. Pat. 3,364,156; Reinforcement of Elastomers, ed. by G. Kraus, Interscience Publishers, N.Y., 1965, Chapters 6, 10, and 12; and Introduction to Rubber Technology, ed. by M. Morton, Reinhold Publishing Corporation, N.Y., 1959, Chapter 8.

The EPDM copolymer, polychloroprene, and reinforcing carbon black are blended to form a premix. Blending can be accomplished using rubber processing equipment familiar in the art. For example, roll mills and internal mixers (such as Banbury mixers) are typical devices which can be conveniently used to prepare the premix. Mixer, loading, operating time and speeds, etc. will be obvious to those skilled in the art.

After the premix has been prepared, about 50-60 parts by weight of natural rubber based on the total weight of rubbers are blended with it to form an elastomeric composition. The premix and natural rubber can be blended in conventional rubber processing equipment as previously described. The elastomeric composition prepared by the process of this invention possesses ozone resistance superior to that of similar compositions not prepared in accordance with the mixing order herein prescribed.

Conventional compounding ingredients such as carbon black, mineral fillers, such as clay, coloring agents, extending oils and the like can be incorporated into the elastomeric composition after the mixing process. Preferably, no ingredient should be added which will reduce ozone resistance.

The composition of this invention can be cured by a variety of curing systems. The most important of these curing systems are the sulfur curing system and peroxide curing system.

This invention is further illustrated by the following specific example. All parts, percentages, and proportions are by weight unless otherwise indicated.

EXAMPLE

Ozone resistant elastomeric composition of natural rubber/polychloroprene/carbon black/EPDM hydrocarbon rubber The ingredients of the recipe given below are mixed according to the procedures described below. Ingredients are mixed in a "Midget Banbury Mixer," Farrel Corp., having a 250-ml. void. The mixer is operated at 142 r.p.m. All mixes are started at 90° F. (32° C.) and dumped between 175 and 200° F. (79° C. and 93° C.). Total mixing time is 12 minutes in each case.

| Recipe: | G. |
|---|---|
| Natural rubber, smoked sheets (RSS #1) | 102 |
| Polychloroprene | 61 |
| EPDM copolymer | 41 |
| Fast extrusion furnace black (ASTM Type N-550) | 52 |
| Zinc oxide | 7.2 |
| Naphthenic processing oil | 5.7 |

The polychloroprene has a Mooney viscosity (ML-1+2.5/100° C.)

of about 50 and is prepared in accordance with Example 1 of U.S. Pat. 2,914,497.

The EPDM copolymer is a rubber-like hydrocarbon copolymer having a Mooney viscosity (ML-1+4/121° C.) of about 70, an inherent viscosity of about 3.7 measured at 30° C. on a solution of 0.1 gram of copolymer in 100 ml. of tetrachloroethylene), and the following monomer unit concentration (by weight): ethylene, 52.4%; propylene, 44%; total 1,4-hexadiene, 3.6%; the ethylenic group content amounts to about 0.33 gram-mol/ kg. The ethylenic group content is determined by corrected bromine absorption as described under "1,4-hexadiene content" in U.S. Pat. 3,467,633. Mooney viscosity is measured in accordance with ASTM Method D–1646–63.

The naphthenic processing oil, ASTM D–2226 Type 103, has a specific gravity at 60° F. (15.6° C.) of 0.92, a SUS viscosity by ASTM Test D–88 (100° F./210° F.) (37.8° C./98.9° C.) of 156/41, and 42.9% total aromatics. It is available from Sun Oil Company under the trademark "Circo" light rubber processing oil. The use of zinc oxide and processing oil is optional.

The furnace black has an EM surface area of about 80 square meters per gram and a DBF absorption (dibutyl phthalate absorption number by ASTM Test D–2414–65T) of about 127 cc./100 grams.

The elastomeric compositions are prepared as follows. In each case, a premix is prepared followed by the addition of the balance of the recipe and further mixing.

| Sample Number | Order of addition and mixing times |
|---|---|
| 1 | Smoked sheets, 5 minutes. Add remainder of recipe, 7 minutes. |
| 2 | Smoked sheets and black, 4 minutes. Add remainder of recipe, 7 minutes. |
| 3 | Smoked sheets and polychloroprene, 5 minutes. Add remainder of recipe, 7 minutes. |
| 4 | Smoked sheets and black, 5 minutes. Add remainder of recipe, 7 minutes. |
| 5 | Smoked sheets and EPDM, 5 minutes. Add remainder of recipe, 7 minutes. |
| 6 | Smoked sheets, EPDM, polychloroprene, 2 minutes. Add remainder of recipe, 10 minutes. |
| 7 | Smoked sheets and EPDM, 5 minutes. Add remainder of recipe, 7 minutes. |
| 8 | Smoked sheets, EPDM, black, 5 minutes. Add remainder of recipe, 7 minutes. |
| 9 | EPDM, polychloroprene, black, 5 minutes. Add remainder of recipe, 7 minutes. |
| 10 | EPDM and black, 5 minutes. Add remainder of recipe, 7 minutes. |

Sample No. 9 is an elastomeric composition prepared in accordance with the process of this invention. The remainder of the samples are for comparison.

Each of the above samples is compounded with curing ingredients on a 4″ x 8″ (10.2 x 20.3 cm.) roll mill according to the following recipe:

| | G. |
|---|---|
| Sample from Banbury | 200 |
| Stearic acid | 3.3 |
| MBTS (benzothiazyl disulfide) | 0.76 |
| DPG (diphenyl guanidine) | 0.53 |
| Sulfur | 2.0 |
| Magnesium oxide | 0.6 |

A portion of each sample is formed into slabs 1″ x 5″ by 75 mils (2.54 x 12.7 x 0.14 cm.) thick and press-cured between polyester ("Mylar") sheets for 15 minutes at 320° F. (160° C.). The samples are taken out of the press and the polyester sheets removed. Standard dumbbells (die "C," ASTM-D–412) are cut from the 1″ x 5″ (2.54 x 12.7 cm.) slabs and allowed to stand at room temperature for at least 24 hours before testing.

Ozone resistance test

The dumbbells prepared as described above are exposed to ozone at a concentration of 50 p.p.h.m. and a temperature of 40° C. in a "Mast" test chamber (Model 700–1 manufactured by Mast Development Co., Davenport, Iowa). The dumbbells are tested dynamically in the "Dynamat" attachment. This is a device in which the dumbbells are clamped at either end, then alternately stretched to an elongation of about 25% and returned to an unstressed condition at about 30 cycles per minute.

Results

The appearance of the samples at the end of 24 hours is recorded below. The number ratings refer to the ozone resistance standards appearing in the figure.

| Sample No.: | Rating |
|---|---|
| 1 | 3. |
| 2 | 5. |
| 3 | 5, dumbbell broken. |
| 4 | 4. |
| 5 | 5. |
| 6 | 5, dumbbell nearly broken. |
| 7 | 5, dumbbell broken. |
| 8 | 5s. |
| 9 | 10, few very small flaws. |
| 10 | 5s. |

Thus sample number 9 gives results clearly superior to any other sample.

I claim:

1. A process for preparing a vulcanizable ozone resistant composition consisting essentially of natural rubber, carbon black, polychloroprene, and an EPDM copolymer which consists essentially of preparing a premix by mixing about 15–30 parts based on the total weight of rubbers of a random, linear, elastomeric ethylene/propylene/open-chain non-conjugated diene copolymer having a Mooney viscosity (ML–1+4/121° C.) of about 35–75 with about 20–35 parts based on the total weight of rubbers of a mercaptan-modified sol polymer of chloroprene having a Mooney viscosity (ML–1+2.5/100° C.) of about 50, and about 25–60 parts based on the total weight of rubbers of a reinforcing carbon black having an EM surface area of at least about 40 square meters per gram, and mixing the premix with about 50–60 parts based on the weight of total rubbers of natural rubber.

2. The process of claim 1 in which the EPDM copolymer is ethylene/propylene/1,4-hexadiene.

3. The process of claim 1 in which the EPDM copolymer is about 18–22 parts based on the weight of total rubbers of ethylene/propylene/1,4-hexadiene having a Mooney viscosity (ML–1+4/121° C.) of about 40–70.

4. The process of claim 3 in which the mercaptan-modified sol polymer of chloroprene is about 28–32 parts based on the weight of total rubbers.

5. The process of claim 4 in which the natural rubbers is about 48–52 parts based on the weight of total rubbers.

6. The process of claim 5 in which the reinforcing carbon black is about 25–50 parts based on the weight of total rubbers.

7. The process of claim 6 in which the reinforcing carbon black is FEF or HAF carbon black.

8. The product of the process of claim 1.
9. The product of the process of claim 2.
10. The product of the process of claim 6.
11. The product of the process of claim 7.

References Cited

UNITED STATES PATENTS 3,443,619   5/1969   Kindle _____ 260—5

JOHN C. BLEUTGE, Primary Examiner

U.S. Cl. X.R.

260—4 R, 23.7 M, 41.5 MP, 889